United States Patent
Korobkov et al.

(10) Patent No.: US 8,416,864 B2
(45) Date of Patent: Apr. 9, 2013

(54) INITIALIZATION OF AND MODEM FOR AN OFDM DATA TRANSMISSION

(75) Inventors: Dmitri Korobkov, Frankfurt (DE); Patrick Langfeld, Karisruhe (DE); Vladimir Potapov, Frankfurt (DE); Christian Leeb, Zurich (CH); Hans-Joerg Maag, Zurich (CH); Hans Benninger, Turgi (CH); Stefan Ramseier, Kirchdorf (CH)

(73) Assignee: ABB Technology AG

( * ) Notice: Subject to any disclaimer, the term of this patent is extended or adjusted under 35 U.S.C. 154(b) by 939 days.

(21) Appl. No.: 12/493,753

(22) Filed: Jun. 29, 2009

(65) Prior Publication Data

US 2010/0054314 A1    Mar. 4, 2010

Related U.S. Application Data

(63) Continuation of application No. PCT/EP2007/064481, filed on Dec. 21, 2007.

(30) Foreign Application Priority Data

Dec. 27, 2006  (EP) ..................... 06405544

(51) Int. Cl.
*H04K 1/10* (2006.01)
*H04L 27/28* (2006.01)
(52) U.S. Cl.
USPC .......... 375/260; 375/267; 375/301; 375/333; 375/220
(58) Field of Classification Search .................. 375/260, 375/262
See application file for complete search history.

(56) References Cited

U.S. PATENT DOCUMENTS

| 6,175,550 B1 * | 1/2001 | van Nee ......... 370/206 |
| 7,418,043 B2 * | 8/2008 | Shattil ............ 375/260 |

(Continued)

FOREIGN PATENT DOCUMENTS

| DE | 44 02 512 C1 | 6/1995 |
| EP | 1 379 020 A1 | 1/2004 |

OTHER PUBLICATIONS

Chow, Jacky S. et al; "A Discrete Multitone Transceiver System for HDSL Applications", IEEE Communications Journal, vol. 9, No. 6; Aug. 1991; p. 895-908.*

(Continued)

*Primary Examiner* — Daniel Washburn
*Assistant Examiner* — Qutbuddin Ghulamali
(74) *Attorney, Agent, or Firm* — Buchanan Ingersoll & Rooney PC

(57) ABSTRACT

A method and modem are provided for obtaining an optimized efficiency of an Orthogonal Frequency Division Multiplex (OFDM) data transmission, such as for power line communication, for example. The length or duration of a guard interval or cyclic prefix in an OFDM symbol is newly selected at each start-up of a modem while initializing or preparing the OFDM data transmission. The length of the guard interval can be given by the number of samples in a time-discrete representation, and the value of such number of samples that is retained for the subsequent data transmission can be selected from a plurality of pre-determined possibilities based on an evaluation of a channel quality of a communication channel including a physical line to which the modem is connected. Hence, the selected value depends on actual transmission conditions, and the optimization potential offered by a more flexible handling of system parameters is exploited to meet changing conditions on the physical line.

19 Claims, 1 Drawing Sheet

U.S. PATENT DOCUMENTS

| | | | |
|---|---|---|---|
| 7,430,242 B2* | 9/2008 | Harikumar et al. | 375/260 |
| 2002/0126780 A1 | 9/2002 | Oshima et al. | |
| 2002/0163959 A1* | 11/2002 | Haddad | 375/229 |
| 2004/0218522 A1 | 11/2004 | Sundstrom et al. | |
| 2007/0159957 A1* | 7/2007 | Ljung et al. | 370/208 |
| 2008/0117999 A1* | 5/2008 | Kadous et al. | 375/267 |

OTHER PUBLICATIONS

Form PCT/ISA/210 (International Search Report) dated Aug. 4, 2008.

Form PCT/ISA/237 (Written Opinion of the International Searching Authority) dated Aug. 4, 2008.

Naofal Al-Dhaher, "Overview and Comparison of Equalization Schemes for Space-Time-Coded Signals With Application to Edge", IEEE Transactions on Signal Processing, vol. 50, No. 10, Oct. 2002, pp. 2477-2488, XP-011080244.

Uwe Dettmar et al., "Modulation for Hiperlan Type 2", Vehicular Technology Conference, 1999 IEEE 49th, May 16-20, 1999, vol. 2, pp. 1094-1100, XP-010342067.

Fredrik Kristensen et al., "A Generic Transmitter for Wireless OFDM Systems", The 14th IEEE 2003 International Symposium on Personal Indoor and Mobile Radio Communication Proceedings, vol. 2, Sep. 7, 2003, pp. 2234-2238, XP-010678027.

Angela Doufexi et al., "Design Considerations and Initial Physical Layer Performance Results for a Space Time Coded OFDM 4G Cellular Network", Personal, Indoor and Mobile Radio Communications, The 13th IEEE International Symposium, vol. 1, Sep. 15, 2002, pp. 192-196, XP-010614213.

O. Oteri et al., "Time and Frequency Equalization in 802.11a/g", Institute of Electrical and Electronics Engineers, Conference Record of the 13th Asilomar Conference on Signals, Systems, & Computers, vol. 1 of 2 Conf. 37, Nov. 9, 2003, pp. 698-702, XP-010701566.

Milos Vilosevic et al., "Simultaneous Multichannel Time Domain Equalizer Design Based on the Maximum Composite Shortening SNR", Institute of Electrical and Electronics Engineers, Conference Record of the 36th Asilomar Conference on Signals, Systems, & Computers, IEEE, vol. 1 of 2, Conf. 36, Nov. 3, 2002, pp. 1895-1899, XP-010638521.

M. Van Bladel et al. "Time-Domain Equalization for Multicarrier Communication," Global Telecommunications Conference, Conference Record, Communication Theory Mini-Conference, Globecom '95, IEEE Singapore, Nov. 13-17, 1995, pp. 167-171, XP-010159493.

E. Carni et al., "Synchronous CDMA Based on the Cyclical Translations of a Cazac Sequence," Wireless Communication Systems, 2nd International Symposium, Siena Itally Sep. 5-9, 2005, pp. 442-446, XP-010886290.

* cited by examiner

INITIALIZATION OF AND MODEM FOR AN OFDM DATA TRANSMISSION

RELATED APPLICATIONS

This application claims priority as a continuation application under 35 U.S.C. §120 to PCT/EP2007/064481, which was filed as an International Application on Dec. 21, 2007 designating the U.S., and which claims priority to European Application 06405544.5, filed in Europe on Dec. 27, 2006. The entire contents of these applications are here hereby incorporated by reference in their entireties.

FIELD

The present disclosure relates to the field of Orthogonal Frequency Division Multiplex (OFDM) data transmission, and to an initialization of the OFDM data transmission for optimized efficiency, such as for a Power Line Communication (PLC) over power line communication links at a high or medium voltage, for example.

BACKGROUND

For the transmission of digital data, multi-channel data transmission based on Orthogonal Frequency Division Multiplex (OFDM), also referred to as Discrete Multitone (DMT) modulation, is a known flexible modulation scheme. OFDM spreads the data to be transmitted over a large number of sub-carriers or sub-channels which are contained in a transmission band and separated from each other by well-defined frequency spacing or carrier separation. The latter can ensure-orthogonality of the sub-carriers and prevent crosstalk or inter-carrier interference between sub-carriers. As such, the demodulator for one sub-carrier is not affected by the modulation of the other sub-carriers even though there is no explicit filtering of the sub-carriers and their spectra overlap. The individual OFDM modulation symbols on each of the carriers represent a number of bits that depends on the choice of the QAM alphabet, (i.e., the arrangement of data or constellation points in the quadrature amplitude plain). For instance, a 2 bit/symbol for Quadrature Phase Shift Keying (QPSK), or 4 bit/symbol for 16-QAM (Quadrature Amplitude Modulation) is commonly used. The complex processes of modulating and demodulating thousands of carriers simultaneously are comparable to Discrete Fourier Transform operations, for which efficient Fast Fourier Transform (FFT) algorithms exist.

A suitable modem architecture comprises an encoder to multiplex, synchronize and encode the data to be transferred, as well as a modulator to form a discrete multitone signal. The encoder translates incoming bit streams into in-phase and quadrature components for each of a multiplicity of sub-channels. In particular, the encoder outputs a number of sub-symbol sequences that are equal to the number of sub-channels available to the system. A line monitor at a receiver end repeatedly checks the line quality of the sub-channels by determining the noise-level, gain and phase-shift on each of the sub-channels during use. The bit error rate and the signal-to-noise ratio are then used to dynamically determine the bit transmission rate that the sub-channels can support.

OFDM is, for example, suitable for Power Line Communication (PLC). Power line channels at a high or medium voltage (e.g., above 1 kV) are affected by interferers, because the cable types that are used for the transmission of electric power are unshielded and are therefore vulnerable to electromagnetic ingress. A known noise scenario on power line channels resulting therefrom includes so-called narrowband interferers (i.e., signals with a small bandwidth). In addition, the heterogeneous structure of the power line network with numerous branches and impedance mismatching causes numerous reflections (echoes) and multi-path propagation between the transmitter and receiver. In the presence of multi-path propagation, the complex transfer function h(i) of a power line link between the transmitter and receiver is a sum over a number of paths. In addition, power cables exhibit signal attenuation increasing with length and frequency selective fading.

Intersymbol Interference (ISI) is caused by the interaction of one symbol or waveform with other symbols in time. Multi-path induced ISI can be reduced by the provision of a guard interval. Each modulation symbol is transmitted for a total symbol period $T_{OFDM}$ which is longer than an active symbol period $T_{ORTH}$ by a period called the guard interval $T_{GUARD}$. This implies that the receiver will not experience any inter-symbol interference, provided that any echoes present in the signal have a delay which does not exceed the guard interval. Naturally, the addition of the guard interval reduces the data capacity by an amount dependent on its length, which prohibits its application to a single-carrier system.

A method of shortening a channel Impulse Response IR is disclosed in DE 44 02 512 C1. To shorten the overall channel IR of a communication channel comprising a send filter, a physical power line link between transmitter and receiver, and an input or receive filter, a receive filter transfer function is synthesized after channel estimation during a handshaking procedure.

SUMMARY

An exemplary embodiment of the present disclosure provides a method of initializing an Orthogonal Frequency Division Multiplex (OFDM) data transmission in which OFDM symbols including an orthogonality interval of length N having N samples and a guard interval of length L with L samples are to be transmitted over a physical link. The exemplary method comprises synthesizing, based on an estimated link transfer function of the physical link, an input filter at a modem connected to the physical link; selecting a number $L_{sel}$ of samples of the guard interval based on an Impulse Response of a communication channel comprising the physical link and the synthesized input filter; estimating a channel quality of the physical link; and selecting the number $L_{sel}$ of samples of the guard interval based on the estimated channel quality.

An exemplary embodiment of the present disclosure provides an OFDM modem for Orthogonal Frequency Division Multiplex (OFDM) data transmission in which OFDM symbols including an orthogonality interval having N samples of length N and a guard interval with L samples of length L are transmittable over a physical link to which the OFDM modem is connected. The exemplary modem comprises means for synthesizing, based on an estimated link transfer function of the physical link, an input filter of the modem; means for selecting a number $L_{sel}$ of samples of the guard interval based on an Impulse Response IR of a communication channel including the physical link and the synthesized input filter; means for estimating a channel quality of the physical link; and means for selecting the number $L_{sel}$ of samples of the guard interval based on the estimated channel quality.

BRIEF DESCRIPTION OF THE DRAWINGS

Further advantages and refinements of the present disclosure are explained in more detail below with reference to exemplary embodiments which are illustrated in the attached drawings, in which.

The reference symbols used in the drawings, and their meanings, are listed in summary form in the list of reference symbols following the detailed description of exemplary embodiments. In principle, identical parts are provided with the same reference symbols in the drawings.

DETAILED DESCRIPTION

Exemplary embodiments provided herein can an efficiency of an Orthogonal Frequency Division Multiplex (OFDM) data transmission, such as for power line communication, for example. For instance, exemplary embodiments provide a method of initializing an OFDM data transmission and an OFDM modem according to various advantageous aspects as described in further detail below.

According to an exemplary embodiment, the length or duration of a guard interval or cyclic prefix in an OFDM symbol can be selected from scratch (i.e., newly selected) at every start-up of a modem while initializing or preparing the OFDM data transmission. The length of the guard interval can be given by the number L of samples in a time-discrete representation, and the value of L that is retained for the subsequent data transmission can be selected from a plurality of pre-determined possibilities. The selection can be based on an evaluation of a channel quality of a physical line to which the modem is connected. Hence, the selected value of L can depend on actual transmission conditions and is not unnecessarily large as in the case of a modem manufacturer conservatively pre-setting this parameter.

According to an exemplary embodiment, a length of an orthogonality interval given by a number N of samples in a time-discrete representation can be selected based on the value retained for L and according to further criteria or requirements relating to efficiency and delay. Alternatively, a number N of samples of an orthogonality interval can be pre-selected and taken into account during the subsequent selection of the value of L. In any case, the optimization potential offered by a more flexible handling of the system parameters L and N is exploited in order to meet changing conditions on the physical line.

According to an exemplary embodiment, the length of the guard interval can be chosen to be as short as possible, but above a suitably defined length of a channel Impulse Response (IR) of a communication channel comprising the physical link. The length of the IR can be advantageously minimized by means of a purposely synthesized or prepared input or receive filter at a second modem or receiver, which filter can be considered to be part of the communication channel.

According to an exemplary embodiment, a first value of L corresponding to a minimum tentative or target guard interval is chosen, and an input filter can be prepared based on the chosen first value of L. The length of the respective IR of the communication channel including the filter can be calculated and compared to the length of the tentative guard interval. If a certain criteria is met, the first value of L can be selected as the definite value retained for communication. Otherwise, the procedure is repeated with an increased tentative or target length of the guard interval until this length conforms with the length of the respective IR.

Figure 1:
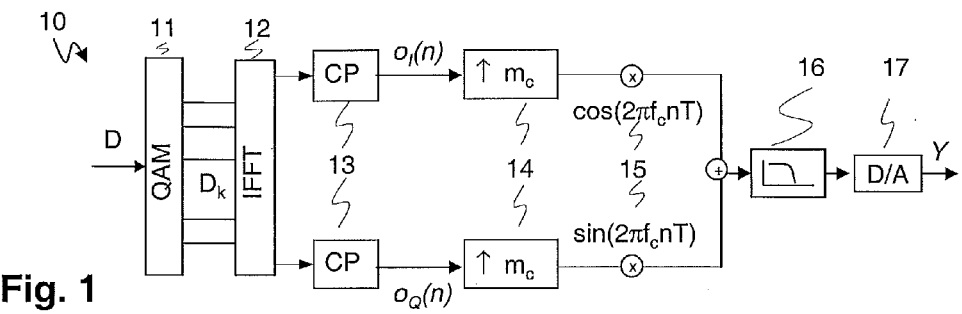
FIG. 1 schematically shows the components of an exemplary OFDM modem according to at least one embodiment.

FIG. 1 shows a digital implementation of an exemplary orthogonal frequency division multiplexing (OFDM) modulation method and an OFDM modem according to at least one embodiment. In an OFDM base modulator 10, a QAM-vectoriser 11 generates a vector of frequency coefficients in accordance with parallelised digital input bits from a digital input signal D input to the QAM-vectoriser 11. According to a mapping scheme such as $2^M$QAM (Quadrature Amplitude Modulation) or, as a special case thereof, $2^M$DPSK (Differential Phase Shift Keying) modulation, the frequency coefficients are generally complex $2^M$-ary symbols $D_k$. From the vector of frequency coefficients, an Inverse Fast Fourier Transform (IFFT) 12 can generate an in-phase component I and an orthogonal quadrature component Q of a discrete multitone signal. In block 13, each of the components can be padded with a cyclic prefix or guard interval by copying a part of the discrete multitone signal as detailed below, resulting in two real-valued sequences at sampling rate $1/T_O$, (i.e., an in-phase component $o_I(n)$ and a quadrature component $o_Q(n)$ of the modulated digital signal).

In order to prepare the OFDM signal for a frequency shift, the components can be upsampled by a factor $m_{1O}$ in upsampler 14, where $m_{1O} > (2f_o+B_o)T_O$, with $B_0$ being the bandwidth of the OFDM transmission band and $f_0$ being its center or frequency offset, is satisfied to fulfil the sampling theorem. In the next modulation step, in an OFDM modulator frequency shifter 15, the mid-frequencies of the spectrum of $o_I$ and $o_Q$ are finally moved to $\pm f_O$. The resulting signals are summed up to build a digital signal which can then be filtered in send filter 16 and converted, in a D/A converter 17, to an analogue signal Y for amplification and transmission.

In an exemplary OFDM transmission system according to various embodiments disclosed herein, modulation can be performed on a block of M bits of data at a time, yielding, according to a coding scheme as detailed above, N complex numbers $C_k$ that are assigned to the N orthogonal frequencies. An Inverse fast or discrete Fourier Transform (IFT) can convert the N complex numbers $C_k$ into a time-discrete orthogonality symbol or interval of length $T_{ORTH}=t_s$ and including N complex sampling values such that $T_{ORTH}=t_s=NT$, with T being a transmitter timing or sampling period. The signal for the guard interval of length $T_{GUARD}=t_g=LT$, (i.e., including L complex sampling values) can be prefixed to, as an extension of, each of the orthogonality symbols to form an OFDM or transmission symbol of length $T_{OFDM}$. In short, each OFDM symbol can include an orthogonality interval of length $T_{ORTH}$ and a guard interval of length $T_{GUARD}$, and can have a length $T_{OFDM}=T_{ORTH}+T_{GUARD}=(N+L)/f_s$, where the sampling frequency $f_s=1/T$ equals the Nyquist frequency of the transmission band of the channel.

According to an exemplary embodiment, for optimal use of the available frequency band of the communication channel, the sampling rate or frequency $f_s=1/T$ at which samples of the transmit signal are generated can be chosen close to the channel bandwidth (e.g. 4 kHz or 32 kHz), which usually is not a design parameter but is given by the application. The interval or separation between adjacent carrier or transmission frequencies is denoted $\Delta f$, and in the following, is assumed equal to the symbol rate, i.e., $\Delta f=1/NT$. Therefore, in practice, the selection of N as detailed below can also be factored into determining $\Delta f$.

Figure 2:
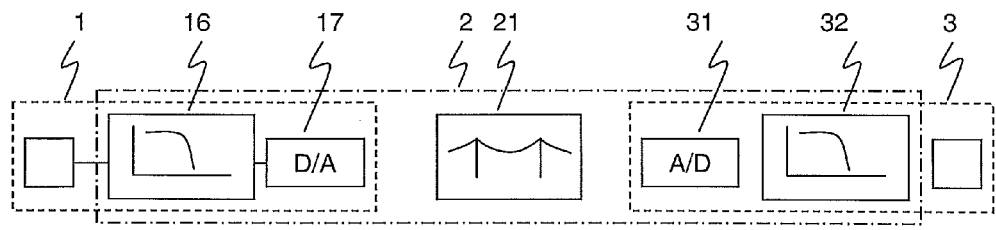
FIG. 2 shows an exemplary transmission channel with transmit filter, physical link and receive filter.

FIG. 2 depicts an exemplary communication channel 2 according to at least one embodiment. According to the exemplary configuration illustrated in FIG. 2, the channel 2 can include all the elements between the modulation and cyclic prefix in a sender/transmitter modem 1 and extraction of the orthogonality interval and demodulation in a receiver modem 3. For example, besides the physical power line link 21 between the transmitter and receiver, the send filter 16 and input filter 32, which can be referred to as a receive filter, can be part of the communication channel 2.

In accordance with an exemplary embodiment, a manual or automated selection of a guard interval, (i.e., the specification of the number L of samples included or the corresponding length $T_{GUARD}=t_g=LT$) can include observation of the following factors:

A) In order to avoid Intersymbol-Interference (ISI) between successive OFDM symbols, the length $T_{GUARD}$ of the guard interval should be chosen to be at least equal to a suitably defined length $T_{CHANNEL}$ of the channel Impulse Response (IR) function of the above-defined communication channel 2, in which, according to the foregoing description, a major share of the energy of the channel IR function can be within an interval of length $T_{CHANNEL}$.

B) The efficiency of the transmission can represent a further requirement related to the choice of the integers N and L. As the receiver discards the guard interval and extracts the orthogonality interval for demodulation, the efficiency can be increased with a decrease in the length of the guard interval and can conveniently be defined by the ratio L/N.

C) The delay of the transmission can represent a third requirement influencing the choice of the numbers N and L. The delay can be caused by the block-wise transmission and processing of the signals and data, and can be proportional to the OFDM symbol length; (e.g., empirically $T_{DELAY} \approx 5\, T_{OFDM}$). For instance, for a channel bandwidth of 4 kHz and N=64, the delay can be close to 100 ms. According to an exemplary embodiment, this delay may not exceed certain upper limits due to constraints of the underlying real time application. Hence, if e.g. the length of the guard interval is given, the maximum allowed delay imposes an upper limit to $T_{ORTH}$.

So far, OFDM modems have been known with a fixed, predetermined, or at best manually selectable length of the orthogonality and guard interval, with exemplary factory settings of N=128 or 64 and L=8. According to an exemplary embodiment of the present disclosure, and respecting $L/N \leq 1/8$ for reasons of efficiency as the only constraint, the following exemplary combinations of L and N may be selected:

| N | L | | | |
|---|---|---|---|---|
| 64 | 8 | | | |
| 128 | 8 | 16 | | |
| 256 | 8 | 16 | 32 | |
| 512 | 8 | 16 | 32 | 64 |

As a consequence of factor A) above, the derivation of a minimal length of the guard interval can be closely linked to the length $T_{CHANNEL}$ of the channel Impulse Response (IR). In accordance with the above exemplary description of the channel 2, the channel IR can include a convolution of the impulse response of the filters 16, 32 and the complex link transfer function K of the physical power line link 21. The patent DE 44 02 512 mentioned above, which is herein incorporated by in its entirety reference, discloses a procedure to shorten the channel IR. According to this procedure, the input or receive filter 32 of the receiver can be synthesized such that the transmission channel has an IR that concentrates a major share of its energy in a small temporal range that is, for example, designated the length $T_{CHANNEL}$ of the shortened IR. A successful shortening of the channel IR allows reducing subsequently the length of the guard interval without violating factor A) above, i.e. $T_{GUARD} \geq T_{CHANNEL}$. Finally, the length N of the orthogonality symbol can be chosen in accordance with the above table and factors B) and C).

Figure 3:
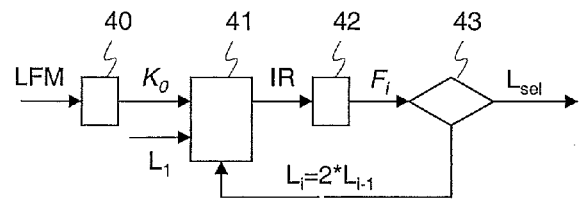
FIG. 3 is a flow chart of an exemplary process of determining an optimum length of the guard interval.

FIG. 3 depicts a flowchart of an exemplary procedure of adapting the length of the guard interval. The outcome of the procedure can depend on the properties of the physical link 21 of the communication channel 2, such as a channel quality including, for example, the link transfer function K of the physical link 21. Accordingly, in preparatory step 40, the receiver 3 can receive a signal that has been emitted by the sender I as a pre-defined Linear Frequency Modulated (LFM) sweep-signal or sequence, or alternatively, as a pseudo noise signal covering all the frequencies of the channel, and from which the transfer function K can be estimated accurately. As the transfer function K can be quite long, an initial estimate of the sweep-signal can be obtained with a large number of samples $K_0(k)$, wherein this number is related to the maximum symbol length of $N_{MAX}=512$ and $L_{MAX}=64$ of the modem 3, and in the following is assumed, for example, to be equal to $2*N_{MAX}$. Next, a starting value $L_1$ corresponding to a first target length of a tentative guard interval is defined. This first target length can either be the smallest value of L provided by the modem, e.g., $L_1=8$ or even $L_1=7$, or the smallest value in accordance with a pre-selected length of the orthogonality interval.

In step 41, the above-mentioned channel Impulse Response (IR) shortening procedure can be carried out. When the input or receive filter 32 is implemented with the known "overlap-save" method for block oriented processing, the length of the input filter 32 can be limited to N−L+1 for minimum processing time. Accordingly, the input filter 32, i.e. the input or receive filter transfer function, cannot be calculated with an unchanged number ($2*N_{MAX}$) of samples directly from the link transfer function K. Hence, synthesizing or preparing the input filter 32 can begin with the selection of $L_1$ samples by, for example, decimating, and optionally weighting, the samples $K_0(k)$ of the link transfer function in frequency domain. Inverse Fourier Transformation, zero filling, and Forward Fourier Transformation can again yield $2*N_{MAX}$ samples $K_1(k)$ of an interpolated link transfer function. $2*N_{MAX}$ samples of the synthesized input filter transfer function can be obtained from forward Fourier Transformation. Convolution with the link transfer function K and Inverse Fourier Transformation can yield $2*N_{MAX}$ samples $R_1(n)$ of the shortened channel IR.

In step 42, and as further detailed below, a quantitative measure $F_1$ can be determined that indicates quantitatively to which extent the energy of the shortened impulse response can be contained within the range of the target length $L_1$ of the guard interval. In step 43, a decision can be made as to whether the measure $F_1$ is acceptable or not. In other words, the fraction of energy of the channel impulse response contained in a section of length $T_{GUARD}$ can be used as a measure of acceptance. If such fraction of energy of the channel impulse response is considered sufficient, the starting value $L_1$ is retained as the optimum value $L_{sel}$ for the length L of the guard interval. Otherwise, the target length can be increased to the next higher value $L_2$, e.g., as $L_2=2*L_1$. Steps 41 to 43 can then be repeated. If the measure $F_2$ is still not acceptable, the procedure can be repeated with a further increased value $L_i$ of the target length, e.g., $L_3=32$, $L_4=64$.

Figure 4:
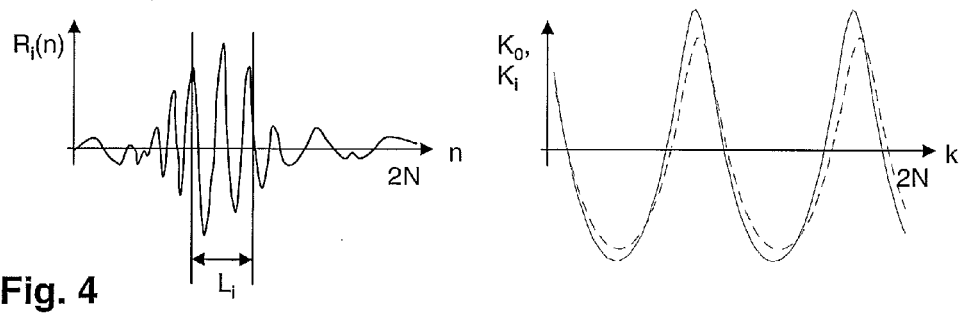
FIG. 4 depicts an exemplary shortened Impulse Response, as well as an exemplary estimated and interpolated link transfer function.

FIG. 4 illustrates an exemplary outcome of the IR shortening in step 41, based on which the measure $F_i$ is determined in step 42. On the left hand side of FIG. 4 are depicted 2N samples $R_i(n)$ of a time-domain representation of the $i^{th}$ shortened IR of the communication channel. The interval of width $L_i$ represents the target length. By means of Fisher Statistics, the energy of the samples inside a moving window of width W equal to $L_i$ can be calculated and compared to the total energy of the 2N samples as $$F_i(W) = \frac{\frac{1}{W}\sum_{n \in W} R_i^2(n)}{\sum_{n=1}^{2N} R_i^2(n)}$$

The maximum value for the measure $F_i(W)$ obtained for all windows of width W can then be compared to a threshold in step 43.

Alternatively, on the right hand side of FIG. 4, a representation in frequency domain is depicted of the link transfer function $K_0(k)$ and the $i^{th}$ interpolated link transfer function $K_i(k)$ as an approximation of the former. The normalized difference between the two, which can be calculated as $$F_i = \frac{\sum_k |K_0 - K_i|^2}{\sum_k |K_0|^2}$$

defines another measure of the accuracy of the subsequently synthesized filter transfer function and shortened channel IR. For instance, according to an exemplary embodiment, the smaller the above difference is, the better the approximation of the estimated "true" link transfer function $K_0$ by the interpolated transfer function $K_i$, and the shorter the IR of the communication channel including the input filter synthesized on the basis of the interpolated transfer function $K_i$. According to an exemplary embodiment the obtained measure $F_i$ can be compared to a threshold in step 43, wherein the latter actually can be determined in a semi-heuristic way, but with less ambiguity than the threshold provided above.

In accordance with the above-mentioned exemplary procedure, the length of the guard interval can be assured to exceed the suitably defined length of the shortened impulse response, i.e., $T_{GUARD} = L_{sel}/f_s \geq T_{CHANNEL}$. The length N of the orthogonality interval finally can be determined by considering the remaining factors B) and C). Maximized efficiency can be reached for $N=N_{MAX}=512$, for example. However, if the maximum delay is not respected for this combination ($N_{MAX}+L_{sel}$), the next smaller values of N are successively selected, i.e. $N_i=N_{i-1}/2$ with $N_1=N_{MAX}$ as long as the efficiency requirement is still respected, i.e. as long as the combination $N_i$, $L_{sel}$ can be represented in the exemplary table above.

Alternatively, the aforementioned exemplary procedure of assuring the length of the guard interval to exceed the length of the shortened impulse response can be executed after a pre-selection of N by an operator based on overall delay and/or efficiency criteria. Considering the remaining factors B) and C), the lowest value of L can be chosen from the table of exemplary values above, and input as $L_1$ in the IR shortening procedure. If the IR shortening procedure is successful for this value of L, the procedure can be terminated, or another, larger L can be tested.

In accordance with the above-described exemplary embodiments, the automatic selection of the guard interval can be executed as part of an initialisation procedure that may be carried out at a start-up of the modems connected to the power line, which may be initiated, for example, after a switch in the primary network has been operated. The beginning of this procedure can be signalled by means of purportedly coding pilot signals broadcasted by a first modem 1, 3 connected to a first end of a power line link 21. A second modem 3, 1 connected to a second end of the link 21 can acknowledge reception and emit a LFM signal. At the first modem 1, 3, after an estimation of the channel transfer function, the IR shortening can be performed repeatedly, and first optimized values of N and L can be provisionally determined. This result can then be transmitted to the second modem 3, 1 via a robust and redundant QAM4 modulation. By comparison with second provisional optimized values of N and L that can be determined at the second modem 3, 1, the final combination $N_{sel}$, $L_{sel}$ can be determined. If the first and second provisional values for N and L diverge, the higher value for L can be selected, for example, and N can be chosen as proposed by the modem proposing the higher value for L.

In addition, in a second phase following start-up of the modem, and, for example, following any automatic selection of the guard interval, the retained value of L can be verified. To this end, the channel transfer function can be repeatedly estimated during data transmission. If the presently selected value $L_{sel}$ is found to be insufficient or sub-optimal, a procedure in accordance with the exemplary procedure described in the preceding paragraph can be initiated. In power line communication, as long as there are no switching actions or faults in the primary network, the channel qualities can be expected to vary slowly, e.g., on a time scale of hours, mainly due to weather conditions (humidity, temperature). Accordingly, such variations can be readily accounted for by a continual adaptation of the input filter.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| LIST OF DESIGNATIONS | |
|---|---|
| 1 | OFDM modem |
| 10 | OFDM modulator |
| 11 | QAM vectoriser |
| 12 | Inverse Fast Fourier Transform |
| 13 | Cyclic Prefix |
| 14 | Upsampler |
| 15 | Frequency shifter |
| 16 | Send filter |
| 17 | D/A converter |
| 2 | communication channel |
| 21 | Physical link/line |
| 3 | OFDM modem |
| 31 | A/D converter |
| 32 | Input/Receive filter |

What is claimed is:

1. A method of initializing an Orthogonal Frequency Division Multiplex (OFDM) data transmission in which OFDM symbols including an orthogonality interval of length N having N samples and a guard interval of length L with L samples are transmitted over a physical link, the method comprising:

synthesizing, based on an estimated link transfer function of the physical link, an input filter at a modem connected to the physical link;

selecting a number $L_{sel}$ of samples of the guard interval based on an Impulse Response (IR) of a communication channel comprising the physical link and the synthesized input filter;

estimating a channel quality of the physical link; and selecting the number $L_{sel}$ of samples of the guard interval based on the estimated channel quality.

2. The method according to claim 1, comprising:

selecting, following the selection of the number $L_{sel}$ of samples of the guard interval, an orthogonality interval having $N_{sel}$ samples based on the number $L_{sel}$ of samples of the guard interval, or pre-selecting, prior to an estimation of the link transfer function as a determination of the channel quality, an orthogonality interval having $N_{sel}$ samples, and selecting the number $L_{sel}$ of samples of the guard interval based on the selected number of samples $N_{sel}$ of the orthogonality interval.

3. The method according to claim 1, comprising:

synthesizing, based on an estimated link transfer function of the physical link as the channel quality, an input filter at a modem connected to the physical link; and selecting the number $L_{sel}$ of samples of the guard interval based on the (IR) of a communication channel including the physical link and the synthesized input filter.

4. The method according to claim 3, comprising:

selecting $N_{sel}$, $L_{sel}$ by comparing provisional values of N and L obtained by two modems connected to two ends of the physical link, respectively.

5. The method according to claim 1, comprising:

calculating a length $T_{CHANNEL}$ of the IR; and selecting a guard interval with $L_{sel}$ samples corresponding to a length $T_{GUARD}$ of the guard interval greater than the calculated length $T_{CHANNEL}$ of the IR.

6. The method according to claim 1, further comprising:

a) choosing a tentative number of samples $L_1$ of the guard interval of length L;

b) selecting $L_1$ samples from the estimated link transfer function;

c) synthesizing the input filter based on the selected $L_1$ samples;

d) calculating a shortened Impulse Response (IR) of the communication channel;

e) calculating a measure $F_1$ of the shortened IR;

f) selecting the number $L_{sel}=L_1$ of the guard interval if the measure $F_1$ is above a predetermined threshold;

g) choosing a further tentative number $L_2>L_1$ samples of the guard interval and returning to step b) if the measure $F_1$ is equal to or below the predetermined threshold.

7. The method according to claim 6, wherein the step e) comprises:

calculating the measure $F_1$ as a suitable Fisher statistics relating an energy of the shortened IR included in a moving window W of width W equal to $L_1$ to the total energy of the shortened IR.

8. The method according to claim 1, comprising:

selecting $N_{sel}$, $L_{sel}$ by comparing provisional values of N and L obtained by two modems connected to two ends of the physical link, respectively.

9. The method according to claim 1, comprising:

transmitting OFDM data over a high or medium voltage power line as the physical link.

10. The method according to claim 9, wherein the high or medium voltage power line is configured to accommodate voltages exceeding 1 kV.

11. An OFDM modem for Orthogonal Frequency Division Multiplex (OFDM) data transmission in which OFDM symbols including an orthogonality interval having N samples of length N and a guard interval with L samples of length L are transmitted over a physical link to which the OFDM modem is connected, the modem comprising:

means for synthesizing, based on an estimated link transfer function of the physical link, an input filter of the modem;

means for selecting a number $L_{sel}$ of samples of the guard interval based on an Impulse Response IR of a communication channel including the physical link and the synthesized input filter;

means for estimating a channel quality of the physical link; and means for selecting the number $L_{sel}$ of samples of the guard interval based on the estimated channel quality.

12. The OFDM modem according to claim 11, comprising:

means for synthesizing, based on an estimated link transfer function of the physical link as the channel quality, an input filter of the modem; and means for selecting the number $L_{sel}$ of samples of the guard interval based on an Impulse Response of a communication channel including the physical link and the synthesized input filter.

13. A method of initializing an Orthogonal Frequency Division Multiplex (OFDM) data transmission in which OFDM symbols including an orthogonality interval of length N and a guard interval of length L are transmitted over a physical link, the method comprising:

a) choosing a target length $L_1$ of the guard interval of length L;

b) synthesizing, based on $L_1$ and based on an estimated link transfer function $K_0$ of the physical link, an input filter at a modem connected to the physical link;

c) calculating a shortened impulse response (IR) of a communication channel including the physical link and the synthesized input filter;

d) calculating a measure $F_1$ indicative of an extent to which an energy of the shortened IR is contained within the target length $L_1$ of the guard interval;

e) selecting the target length $L_1$ as an optimum length $L_{sel}$ for the guard interval when the measure $F_1$ is above a threshold; and f) otherwise, selecting a further target length $L_2>L_1$ of the guard interval and returning to step b) if the measure $F_1$ is equal to or below the threshold.

14. The method according to claim 13, comprising:

selecting, following the selection of the length $L_{sel}$ of the guard interval, an orthogonality interval of length $N_{sel}$ based on the length $L_{sel}$.

15. The method according to claim 13, wherein the step d) comprises:

calculating the measure $F_1$ as a Fisher statistics relating an energy of the shortened IR comprised in a moving window of width W equal to $L_1$ to the total energy of the shortened IR.

16. The method according to claim 14, comprising:

selecting $N_{sel}$, $L_{sel}$ by comparing provisional values of N and L obtained by two modems connected to two ends of the physical link.

17. The method according to claim 16, comprising:

transmitting OFDM data over a high or medium voltage power line as the physical link.

18. The method according to claim 13, comprising:
selecting $N_{sel}$, $L_{sel}$ by comparing provisional values of N and L obtained by two modems connected to two ends of the physical link.

19. The method according to claim 13, comprising:
transmitting the OFDM data over a high or medium voltage power line as the physical link.

* * * * *